[11] 3,615,924

[72] Inventors Karl Swoboda
Bechardgasse 17, Vienna III;
Maximilian Pater, Albert Bohlergasse 9,
Kapfenberg, Styria, both of Austria
[21] Appl. No. 700,975
[22] Filed Jan. 26, 1968
[45] Patented Oct. 26, 1971
[32] Priority Sept. 23, 1964
[33] Austria
[31] 8121/64
Continuation-in-part of application Ser. No. 486,053, Sept. 9, 1965, now abandoned.

[54] PROCESS AND APPARATUS FOR SURFACE HARDENING HARDENABLE STEELS
4 Claims, 1 Drawing Fig.
[52] U.S. Cl. ........................................... 148/143,
148/4, 148/12.4, 148/39, 219/121 P
[51] Int. Cl. ........................................... C21d 1/06
[50] Field of Search........................................... 148/12,
12.4, 12.9, 4, 31, 39, 134, 143, 154; 219/75, 121;
266/5

[56] References Cited
UNITED STATES PATENTS
| | | | |
|---|---|---|---|
| 2,527,287 | 10/1950 | Ziegler et al. | 148/12.3 |
| 2,717,846 | 9/1955 | Harvey | 148/12.4 |
| 2,922,869 | 1/1960 | Giannini et al. | 219/75 |
| 3,146,336 | 8/1964 | Whitacre | 219/121 |
| 3,240,639 | 3/1966 | Lihl | 148/154 X |

*Primary Examiner*—Charles N. Lovell
*Attorney*—Holman, Holman & Stern

ABSTRACT: This invention relates to surface hardening hardenable steels with the plasma flame from a nozzleless plasma torch. The torch has an inner rod electrode and an outer electrode, which extends axially further than the rod electrode. A stream of ionizable gas passes through the torch and an electric arc discharge is sustained between the electrodes to create a plasma flame. The steel to be hardened is subjected to the flame to heat its surface at an extremely high rate to form metastable austenite. Then further energy is introduced, such as by mechanical shock, to transform the austenite into fine-grained martensite.

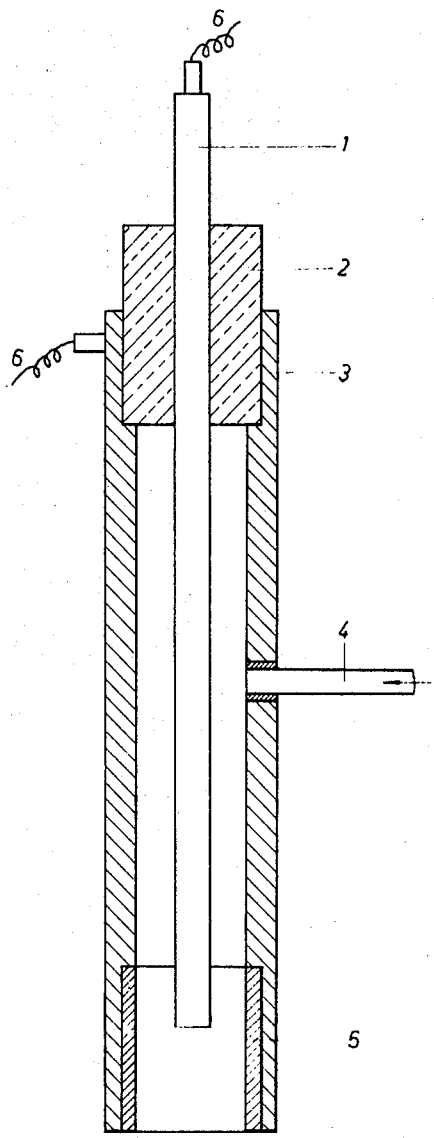

PROCESS AND APPARATUS FOR SURFACE HARDENING HARDENABLE STEELS

This application is a continuation-in-part application of Ser. No. 486,053, filed Sept. 9, 1965 now abandoned.

According to current technology hardenable steels can be surface hardened in such a manner that an austenitic layer, which is metastable at room temperature, is formed in the first stage and this layer is transformed in the second stage by an addition of further energy, e.g. by a mechanical shock, into a fine-grained martensitic structure, which is very hard and very tough. The formation of the metastable austenitic surface layer, which austenite represents a kind of undercooled structure on a steel which is normally ferritic at room temperature, requires an extremely fast heating thereof into the temperature region between the upper transformation point and the melting point of the material. The rapid dissipation of heat which is required is mainly effected by the workpiece itself, and for this reason, does not usually call for additional steps. The transformation into martensite usually occurs when the austenitic surface of the workpiece has to withstand any kind of mechanical strain or shock during use.

This surface-hardening process carried out in two stages eliminates a number of disadvantages which are involved in the usual surface-hardening process. More particularly, the two-stage process can be carried out so as to avoid heat treatment cracks or the formation of a heat valley or zone of reduced hardness in heat-treated and then surface-hardened steel members.

The rapid heating of the surface may be effected, e.g., by means of a steel disc which is rotated at high speed and has a smooth end face, against which the workpiece is forced. In principle, this heating could be effected by all means which enable high energy concentrations to be achieved, such as electron beams, laser beams or plasma beams.

A disadvantage of these means for supplying energy so as to effect an extremely rapid heating of the surface resides in that only a relatively small part of the surface can be heated at a time so that the hardening treatment of large surfaces, or of intricately shaped parts must be carried out in numerous steps, preferably in continuous succession. It is very difficult, however, to accomplish a uniform surface hardening of large surfaces in this way. Besides, the use of energy sources having an extremely high energy concentration requires the provision of expensive equipment, which prevents large-scale applications of the two-stage surface-hardening process.

For this reason there is a desire for an inexpensive energy source which enables a sufficiently high energy concentration. Also, such energy source should be conformable as closely as possible to the shape of the surface to be treated so that the number of partial treatments which are required is minimized and are ideally reduced to a single treatment.

Such energy source has been found in the form of a novel plasma torch. This torch comprises an additional source of charge carriers, rather than a nozzle, for shaping the plasma flame, and this charge carrier source introduces charge carriers into the plasma so as to eliminate the quasi-neutral state thereof. The shaping or focusing of the plasma beam or plasma flame may then be effected by a variation of the three controlling variables a. current value
b. gas feed rate
c. nature of feed gas. By the term "nature of feed gas" is for instance meant whether the gas used is pure argon, or a mixture of argon and nitrogen. Different gases dictate different cross sections of the plasma beam.

Such a plasma torch is extremely simple in structure and for this reason can be manufactured at low cost. It can be operated with direct current or alternating current. The use of alternating current affords the additional advantage in that the rectifier means required for operation with direct current eliminated so that the cost of the equipment is further reduced. It may also be mentioned that the expensive nozzles required for the previous plasma torches have a relatively short life so that the elimination of such nozzles results also in a substantial reduction of the cost of operating such equipment. In this specification and the appended claims, the term "plasma" is not restricted to gases which are in a quasi-neutral state.

An illustrative apparatus for carrying out the process according to the invention is shown on the accompanying drawing and comprises a cylindrical torch tube 3, which is closed at one end by an insulator 2 and which contains a generally axially extending electrode rod 1 of thoriated tungsten. At its other end, the tube 3 may be formed with a cylindrical recess, which extends around the entire inside periphery of the tube and contains a tubular electrode 5, which consists also of thoriated tungsten. The inside surface of the electrode 5 is flush with the inside wall of the torch tube. A gas supply pipe 4 is laterally attached to the torch tube 3. This pipe may tangentially or radially join the tube 3.

If the torch tube 3 consists of a conducting material, such as steel, one of the current supply conductors 6 is connected to the tube 3 which represents the outer electrode and the other to the inner electrode 1.

An electric arc of DC or AC is maintained between the rod-shaped electrode 1 and the tubular electrode 5. The lines of the electric field of said arc are inclined to the direction of flow of the gas which forms the plasma. A magnetic field is thus established, which has a predominant azimuthal component and causes a radial separation between the positive and negative charge carriers. The positive ions migrate inwardly and the electrons migrate outwardly. A positive accelerating charge is thus established before the rod-shaped electrode 1 so that the latter is caused to emit additional electrons and constitutes an additional electron source, which eliminates the quasi-neutral state of the plasma. The annular electrode 5 is another electron source and is not water-cooled. When heated by the electric arc, the electrode 5 also emits electrons. Electron densities of an order of $10^{19}$ electrons per cubic centimeter have been measured in the emerging plasma. The additional electrons emitted by the rod-shaped electrode 1 stabilize the cross section of the plasma, which is focused by the azimuthal magnetic field of the electric arc. The ion cloud before the rod-shaped electrode 1 would otherwise collapse under the action of the repelling forces of the positive charge carriers.

EXAMPLE 1

An inner electrode 6 millimeters in diameter was insulatedly mounted in a steel tube which was 12 millimeters in inside diameter. An annular recess in the inside surface of the steel tube contained an annular insert, which has a length of 15 millimeters and consisted of a sintered mixture of tungsten carbide and cobalt. The inside surface of the liner was flush with the unrecessed part of the inside surface of the steel tube. The inner electrode extended to one half of the length of this insert, which constituted an outer electrode. An AC voltage was applied across the two electrodes so that an electric arc was formed having an arc voltage of 20–25 volts and an arc current of 200 amperes. Argon at a rate of 5 standard liters per minute was used as a plasma-forming gas. These operating conditions resulted in a plasma jet about 6 millimeters in diameter, which emerged from the tube.

The feeding speed of the torch or of the steel member to be hardened was 200–300 millimeters per minute. The distance from the outlet opening of the torch to the surface to be hardened was 5–10 millimeters. Within this range, there was equalizing short circuit currents between the radially separated zones occupied by the positive and negative charge carriers in the plasma jet. Incremental elements of the surface of the workpiece were thus heated by the surface current flowing in such elements to the temperature required for austenitizing. At a greater distance, radially separate zones having charges of opposite polarities were no longer observed. Cooling was effected by the quenching action of the mass of steel which adjoined the heated zone and had remained cold.

EXAMPLE 2

The same operating conditions were adopted as in example 1, except that the gas rate was increased to 10 standard liters per minute. The diameter of the plasma jet was thus reduced to 4 millimeters.

1.5-3

The same operating conditions were adopted as in example 1, except that the arc current was increased to 300 amperes. The diameter of the plasma jet was thus increased to 3 millimeters.

EXAMPLE 4

The same operating conditions were adopted as in example 1, except that a gas mixture of 50 percent argon and 50 percent nitrogen was used. The diameter of the plasma jet was thus reduced to 1.5–2 millimeters.

The invention provides a process of surface-hardening hardenable steels and resides in that in the known two-stage surface-hardening process at least the extremely rapid heating required in the first stage is effected with a nozzleless plasma torch.

The process may comprise passing a stream of ionizable gas through an annular passage and afterwards through a tubular passage, axially immediately succeeding said annular passage, sustaining an electric DC or AC arc discharge between the radially inside boundary surface of said annular passage at said outlet and thereof and the radially inside boundary surface of said tubular passage. The azimuthal magnetic field of said discharge attracts carriers of a charge having a first sign towards the axis of said annular passage at the outlet end thereof and carriers of a charge having a second sign which is opposite to said first sign radially outwardly in a region which is axially beyond the outlet of said annular passage. The steel surface to be hardened is brought in the zone in which the charge carriers of opposite signs are radially separated. It is heated by surface streams flowing from one zone to the other.

The advantage which can be achieved in this process resides mainly in that the two-stage surface hardening process can be carried out with the aid of an energy source which is very simple in structure and for this reason inexpensive, and that the elimination of the nozzles which are required in the usual plasma torch and subject to a rapid wear, results in an avoidance of trouble in operation and in a reduction of the operating costs.

The use of a nozzleless plasma torch which is recommended according to the invention enables also a considerable adustment of the form of the plasma beam and of the rate at which energy is supplied in view of the shape of the workpiece surface to be hardened. Furthermore, in continuous surface-hardening treatments, the shape of the plasma beam and the rate of energy supply can be varied in accordance to the form of the surface even during the treatment.

For instance, surface hardening the working parts of tools, particularly the cutting edges of tools, can be effected in a very simple manner by means of this process. The process according to the invention may also be used to advantage for hardening slideways, dovetail surfaces, or the like. Cylindrical parts are suitably rotated and are treated in this state with a plasma flame which has a low energy concentration and is out of focus as far as possible.

Nozzleless plasma torches operated with alternating current can be controlled in the same way as plasma torches for direct current operation, and have the additional advantage that the equipment is even simpler in structure because the rectifier plant required for direct current operation is eliminated. It has been observed, that the radial separation of charge carriers beyond the outlet end of the annular passage was partly sustained even if alternating current was used, which fact is in accordance with the plasma theory.

The present invention eliminates a major difficulty which previously obstructed the large-scale use of the two-stage surface-hardening process.

What is claimed is:

1. A method of surface hardening hardenable steels which comprises the steps of passing a stream of ionizable gas through an electric arc of a nozzleless plasma torch, which arc is sustained between the tip of a rod electrode and a surrounding tubular electrode, the lines of the electric field of said arc being inclined to the direction of flow of said gas, said gas being ionized in said arc and the azimuthal magnetic field of said arc attracting carriers of a charge having a first sign radially inwardly towards the axis of said tubular electrode and attracting carriers of a charge having a second sign, opposite to said first sign, radially outwardly away from said axis; bringing the surface of a workpiece to be hardened into the zone in which the charge carriers of opposite signs are radially separated, whereby the surface layer is rapidly heated by recombination energy resulting when the opposite sign charge carriers recombine, said surface layer being raised to a temperature between the upper transformation point and the melting point of said steel to form after rapid dissipation of heat by the workpiece an austenitic layer which is metastable at room temperature and imparting an effective amount of energy to said metastable layer to transform same into fine-grained martensite, whereby the surface is hardened.

2. The method as claimed in claim 1, in which said nozzleless plasma torch has an additional source of charge carriers, said charge carrier source introducing charge carriers into the plasma so as to eliminate the quasi-neutral state thereof.

3. The method as claimed in claim 2, wherein the form of the plasma flame and the rate at which energy is supplied by said flame to said surface in accordance with the configuration of the surface to be hardened is controlled by selecting a combination of the following three variables:
   a. current value
   b. gas feed rate
   c. nature of feed gas.

4. A process as set forth in claim 1, in which said torch is operated with alternating current.

* * * * *